Figure 1:
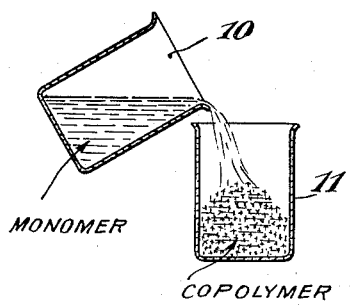

April 16, 1957

W. BAUER 2,788,545

PRODUCTION OF MOLDED ARTICLES FROM MIXED
SYNTHETIC SUBSTANCES
Filed Nov. 20, 1951

AIRTIGHT CONTAINER

STORAGE

INVENTOR
Walter Bauer
BY C. P. Goepel
his ATTORNEY

United States Patent Office 2,788,545
Patented Apr. 16, 1957

2,788,545

PRODUCTION OF MOLDED ARTICLES FROM MIXED SYNTHETIC SUBSTANCES

Walter Bauer, Darmstadt, Germany

Application November 20, 1951, Serial No. 257,418

3 Claims. (Cl. 18—47.5)

This invention relates to production of molded articles from synthetic substances; and it comprises a method of making molded articles wherein a copolymer of vinyl chloride with vinyl acetate, is intimately mixed with at least one monomer, selected from a group consisting of methacrylic acid methyl ester, acrylic acid ethyl ester, methacrylic acid ethyl ester and styrol; an acid amide, selected from a group consisting of acrylic acid amide and methacrylic acid amide, being present in mixtures wherein one of the latter two monomers constitutes the monomeric component of the mixture; the mixture being formed into a substantially homogeneous stable solid mixture free from accelerators and then, when it is desired to produce a molded article, the said mixture is introduced into a mold, being mixed or contacted with an accelerating agent before or after reaching the mold, and the mixture is then pressed and polymerized under the action of heat and pressure; all as more fully hereinafter set forth and as claimed.

It is known to mold mixtures of polymers and monomers. For example methacrylic resin powder, usually in pearl form, has been processed with monomeric methacrylic acid methyl ester with other additions, such as dyes and softening agents and in admixture with accelerators, into a moldable mass and pressed at high temperatures. Dentists, for example, have been supplied a polymeric methacrylic resin powder and monomeric liquid and instructed how to prepare a moldable mass therefrom followed by molding at elevated temperatures to make protheses etc. Attempts have also been made to supply the dental trade with prepared mixtures of these polymers and monomers. But these mixtures proved to be insufficiently stable. The polymers present tended to cause polymerization of the monomers. These mixtures therefore had to be stored in refrigerators or in special containers containing monomers and partly for this reason did not come into extensive use.

I have discovered that certain polymers, such as copolymers of vinyl chloride with vinyl acetate, can be mixed with certain monomers, such as for example methacrylic acid methyl ester and acrylic acid ethyl ester, to produce homogeneous solid mixtures which, provided they are free from accelerators, are stable over long periods of time. These polymers surprisingly have little or no tendency to polymerize the monomers. Increased stability can be achieved by incorporating inhibitors in the mixtures. For example hydroquinone, in amounts ranging from about 0.005 to 0.01%, produces highly stable mixtures. Small amounts of aluminum hydroxide and calcium stearate are also effective.

The inhibitors used must be of the type which do not interfere with the action of the accelerators which are added later under the conditions used in molding. Any inhibitors of this type can be used. They are advantageously used in small amounts in order not to interfere with polymerization during the molding step. When inhibitors are incorporated in my monomer-polymer mixtures these mixtures can even be kneaded at ordinary or even somewhat elevated temperatures without polymerization. These mixtures can therefore be supplied to the trade in granular form or preferably in rods, strips, sheets or other compact form.

The compact form can be obtained mechanically by passing the mixtures through screw presses or the like. The presses deliver uniform, well-densified and practically air-free mixtures in the form of rods, strips, sheets etc. The use of these compact forms results in a considerable simplification of the final processing and therefore represents an important advance in this art.

In the accompanying drawing, Figs. 1, 2, 3 and 4 schematically show the consecutive steps of applicant's novel method.

Figure 2:
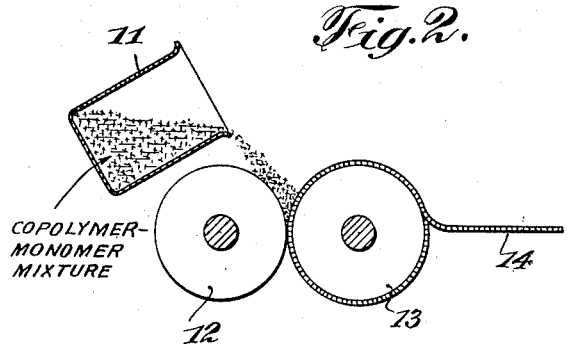
Figure 3:
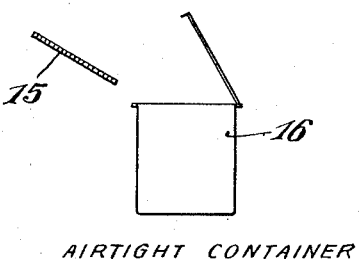
Figure 4:
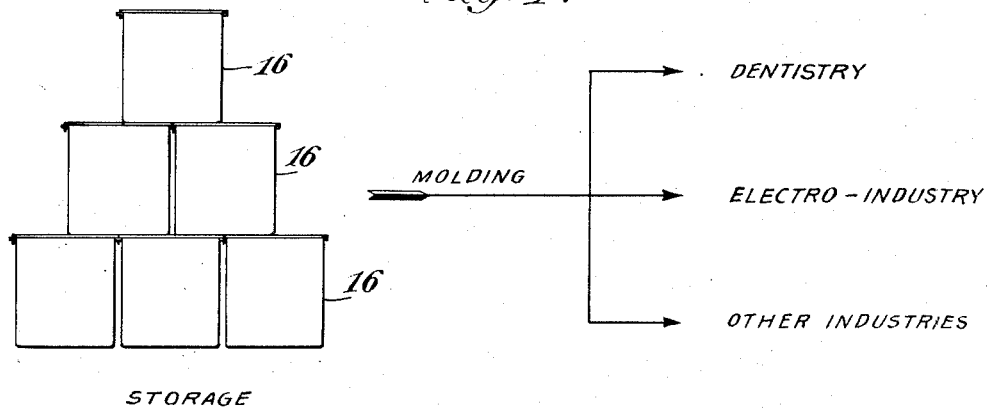

More particularly, Fig. 1 shows the initial step of adding the contents of a vessel 10, containing a monomer which is liquid at normal temperatures, to the copolymer contents of another vessel 11. In Fig. 2, the mixture is submitted to the action of rollers 12, 13 to obtain a sheet or film 14. On cutting of sheet 14 into a plurality of suitably shaped units 15, such units are stored in an airtight container 16, as shown in Fig. 3. Fig. 4 illustrates a plurality of stored containers 16 prior to molding and use in any of the listed industries.

Obviously, the step shown in Fig. 2 is optional, as the polymer-monomer mixture may be stored in any other form or shape depending on requirements in each individual case, such as rods or strips, and may also be stored in granular form, as stated hereinabove.

In the final molding step the accelerator can be dusted on the mass to be molded or into the mold or the mold can be treated with a solution of the accelerator followed by evaporation of the solvent. Any convenient method of bringing the mass to be molded into contact with the accelerator can be used. Then the polymerization is conducted with the use of pressure and heat.

As accelerators for use in my process I have found that organic peroxides, such as benzoyl peroxide, produce best results. Other rapid or ultra accelerators can be used and it is possible to make various additions which will influence the speed of polymerization. Thus it is possible to add redox and metal redox systems in addition to the peroxides. Iron compounds, such as iron stearate, for example can be used. It is also possible to employ mixtures of tertiary amines or sulfinic acid in quantity up to about 5 percent with about the same quantity of peroxides. The optimum proportions of peroxides range from about 1 to 3 percent. It is also possible, of course, to make other additions which reduce the polymerization temperature and increase the velocity of the polymerization.

The combination of the copolymer of vinyl chloride and vinyl acetate with the monomers methacrylic acid methyl ester or acrylic acid ethyl ester appears to be unique for the production of the described results. But if an acid amide is present, selected from a group consisting of acrylic acid amide and methacrylic acid amide, it is possible to employ either methacrylic acid ethyl ester or styrol as the monomeric component of the mixture. These results are all the more surprising in view of the fact that publications are available which claim that protheses for dental and other purposes can be made from a wide selection of polymers and monomers. My tests show that other combinations are inoperative either because they do not possess the required thermoplastic stability or mechanical strength or because the polymers catalyze the polymerization of the monomers. The mixtures of the present invention are even superior to the generally uniform polymeric methacrylic acid methyl ester products with respect to strength of the molded parts as well as processing technique.

The copolymers employed in my process should be as highly polymeric as possible. For example the copolymer consisting of 80 parts vinyl chloride and 20 parts of vinyl acetate should be sufficiently highly polymerized so that upon mixing a test sample with an equal amount of monomeric methacrylic acid methyl ester, a solid granular mass results which does not become dissolved in the liquid or even become viscous. The K value of the polymeric component of my mixtures should lie between about 60 to 90.

It is possible within the scope of the present invention to produce mixtures which are soft even after the polymerization. Such mixtures can be produced which are stable over long periods provided that nothing is present which tends to cause polymerization. The stability of the mixture is, of course, essential. But in my preferred embodiment plastically stable mixtures are produced which are suitable for dental purposes. For this particular purpose the polymeric component of my mixture should contain at least about 50 percent or more of vinyl chloride, the remainder being vinyl acetate, as mentioned previously. A copolymer containing from 75 to 95 percent vinyl chloride with the remainder vinyl acetate has been found to be particularly suitable. The proportion of monomer in the mixture ranges preferably from about 15 to 25 percent but may reach as high as 40 to 50 percent of the total mixture.

The monomeric component of my mixtures may preferably consist of methacrylic acid methyl ester or acrylic acid ethyl ester either alone or in admixture. It is also possible to add, with very good results, to either of these monomers from about 3 to 10 percent of acrylic acid amide or methacrylic acid amide. One satisfactory mixture consists of 75 parts methacrylic acid methyl ester 20 parts of methacrylic acid ethyl ester and 5 parts of one of the amides mentioned. The dye can be added to the polymer or to the monomer or to the mixture before or after the polymerization.

I have also discovered that, while styrol by itself does not give good results because polymerization velocity and strength properties leave something to be desired, it is possible to use styrol in combination with acrylic and methacrylic compounds, for example with the amides mentioned. If this combination is used it is possible to omit methacrylic acid methyl ester from the monomeric component of my mixtures. Thus, if acrylic acid amide or methacrylic acid amide is present in the mixture, it is possible to employ either methacrylic acid ethyl ester or styrol as the monomeric component.

The final polymerization is conducted most advantageously at a temperature of about 70° C. But temperatures within the range of from about 60° to 100° C. are operative. At the end of the molding operation it is possible to raise the temperature still higher for example to about 130° C.

It is possible to manufacture all types of molded products from the mixtures of this invention both for household purposes and for industries such as the electric industry. The mixtures can be molded in any type of mold, such as gypsum or steel. It is also possible to form the mixtures in a mold and then to complete the polymerization outside the mold, preferably in a closed space.

My invention can be described more accurately by reference to the following specific examples which represent preferred operating embodiments thereof.

*Example 1*

25 parts by weight acrylic acid ethyl ester are mixed with 65 parts by weight of a copolymer of 95 parts vinyl chloride and 5 parts vinyl acetate, in powdered form, and extensively homogenized in a mixer at about 40° C., that is, under mild heat, and finally processed on a suitable machine under pressure into a compact film. This film was found to be stable in storage and useful in the electrical industry for sealing purposes or for connecting parts, in a procedure in which benzoyl peroxide is powdered on the sheet in catalytic quantity and heat is used to carry out the polymerization. Polymerization can also be effected in other ways, for example by the action of high frequency electric currents. Instead of powdering the accelerator on the film it can also be applied in the form of a solution to the wall of a mold followed by evaporation of the solvent.

*Example 2*

A pearly copolymer of 80 gm. vinyl chloride and 20 gm. vinyl acetate is mixed with 0.5 g. of a pink dye and 100 gm. methacrylic acid methyl ester with an addition of about 0.005 g. hydroquinone. The resulting mixture is either processed in the granulated form as obtained, or still better, pressed under pressure at preferably slightly higher temperatures into a film which is practically free of air inclusions and substantially homogeneous. This film has practically unlimited stability, a property which represents an important technical advance in connection with the easy processability of this mass. It can be shipped in air-tight containers and stored for any desired length of time until processed. For processing the mass is for example put into molds, with walls previously treated with a solution of an accelerating agent, such as benzoyl peroxide, so that after evaporation of the solvent small quantities of the accelerating agent remain on the mold wall, which under the influence on occasion of other accelerating agents such as heat, light rays, etc. effect polymerization. Light rays can if desired also be used alone. In this manner artificial dentures, teeth and other industrial articles, such as articles for the electrical industry and household articles can be produced. For this purpose the polymerization does not need to be carried out in the mold. By pressing such a mass sufficiently plastically stable articles are obtained without polymerization, which then can be polymerized subsequently in a closed space, preferably with the exclusion of air.

While I have described what I consider to be the preferred embodiments of my process, it is evident, of course, that various modifications can be made in the specific procedures which have been disclosed without departing from the purview of this invention. It is evident, for example, that various fillers, pigments and other conventional additives can be incorporated in my moldable mixtures at any suitable point in the process. Any of the conventional accelerating agents can be used in conventional proportions in the process and any usitable method can be used to shape the final articles from the pre-formed mixtures. While all types of molded articles can be made with my process this process seems to be particularly adapted to the making of dental articles, such as teeth, tooth crowns, plates and the like. Other modifications of my process which fall within the scope of the following claims will be immediately evident to those skilled in this art.

What I claim is:

1. In the manufacture of molded articles, the process which comprises making a moldable mixture of a polymer component and a monomeric component, said polymeric component being a copolymer of vinyl chloride and vinyl acetate having a K value of about 60 to 90, and said monomeric component consisting of at least one lower ester of the acrylic and methacrylic acid which is polymerizable and liquid at normal temperatures, said mixture being free of accelerating agents and containing between 15 and 20 percent of said monomeric component, and forming said mixture into a substantially homogeneous plastic mass which is stable in storage and shipping at normal temperatures.

2. In the manufacture of molded articles, the process which comprises making a mixture of a polymeric component and a monomeric component, said polymeric component being a copolymer of vinyl chloride and vinyl acetate having a K value of about 60 to 90, said polymeric component being present in said mixture in the proportions of at least 75 percent, said monomeric component comprising at least one monomer selected from the group consisting of methacrylic acid methyl ester, acrylic acid ethyl ester, mixtures of methacrylic acid ethyl ester with acrylic acid amide and methacrylic acid amide, and mixtures of styrol with acrylic acid amide and methacrylic acid amide, said polymer-monomer mixture being free from accelerating agents, forming said polymer-monomer mixture into a substantially homogeneous compact plastic mass which is stable in storage and shipping at normal temperatures, introducing said formed mixture into a mold, contacting the mixture with an accelerator and then polymerizing under the action of heat and pressure.

3. In the manufacture of molded articles, the process which comprises making a mixture of a polymeric component and a monomeric component, said polymeric component being a copolymer of vinyl chloride and vinyl acetate having a K value of about 60 to 90, said polymeric component being present in said mixture in the proportions of at least 75 percent, said monomeric component comprising at least one monomer selected from the group consisting of methacrylic acid methyl ester, acrylic acid ethyl ester, mixtures of methacrylic acid ethyl ester with acrylic acid amide and methacrylic acid amide, and mixtures of styrol with acrylic acid amide and methacrylic acid amide, said polymer-monomer mixture being free from accelerating agents, forming said polymer-monomer mixture into a granular plastic mass which is stable in storage and shipping at normal temperatures, introducing said formed mixture into a mold, contacting the mixture with an accelerator and then polymerizing under the action of heat and pressure.

References Cited in the file of this patent

UNITED STATES PATENTS

| | | |
|---|---|---|
| 2,285,370 | Staelin | June 2, 1942 |

FOREIGN PATENTS

| | | |
|---|---|---|
| 498,679 | Great Britain | Jan. 9, 1939 |
| 574,804 | Great Britain | Jan. 22, 1946 |
| 577,432 | Great Britain | May 17, 1946 |
| 606,936 | Great Britain | Aug. 23, 1948 |